United States Patent [19]
Brown

[11] Patent Number: 6,093,670
[45] Date of Patent: Jul. 25, 2000

[54] CARBON MONOXIDE OXIDATION CATALYST AND PROCESS THEREFOR

[75] Inventor: Scott H. Brown, Bartlesville, Okla.

[73] Assignee: Phillips Petroleum Company, Bartlesville, Okla.

[21] Appl. No.: 09/210,181

[22] Filed: Dec. 11, 1998

[51] Int. Cl.[7] .................................................. B01J 38/18
[52] U.S. Cl. .............................. 502/50; 502/38; 502/53; 423/247; 423/437.2
[58] Field of Search ................................. 502/53, 38, 50; 423/247, 437.2

[56] References Cited

U.S. PATENT DOCUMENTS

| | | | |
|---|---|---|---|
| 3,758,666 | 9/1973 | Frevel et al. . | |
| 4,524,051 | 6/1985 | Wright et al. | 423/247 |
| 4,572,829 | 2/1986 | Fuderer | 423/359 |
| 4,639,432 | 1/1987 | Holt et al. | 502/324 |
| 4,808,394 | 2/1989 | Kolts et al. | 423/437 |
| 4,818,745 | 4/1989 | Kolts | 502/327 |
| 4,902,660 | 2/1990 | Delzer et al. | 502/174 |
| 4,911,904 | 3/1990 | Delzer et al. | 423/437 |
| 4,920,088 | 4/1990 | Kolts | 502/326 |
| 4,921,830 | 5/1990 | Kolts | 502/326 |
| 4,943,550 | 7/1990 | Kolts et al. | 502/327 |
| 5,009,872 | 4/1991 | Chuang et al. | 423/245.3 |
| 5,017,357 | 5/1991 | Kolts et al. | 423/437 |
| 5,157,204 | 10/1992 | Brown et al. | 585/850 |
| 5,310,713 | 5/1994 | Kojima et al. . | |
| 5,405,583 | 4/1995 | Goswami et al. | 422/86 |
| 5,451,558 | 9/1995 | Campbell et al. . | |
| 5,478,370 | 12/1995 | Spangler | 48/197 R |
| 5,599,758 | 2/1997 | Guth et al. . | |
| 5,607,650 | 3/1997 | Debbage et al. . | |

*Primary Examiner*—Steven P. Griffin
*Assistant Examiner*—Christina Ildebrando
*Attorney, Agent, or Firm*—Lucas K. Shay; Richmond, Hitchcock, Fish & Dollar

[57] ABSTRACT

A process for decreasing the air-sensitivity of a carbon monoxide oxidation catalyst composition is provided. The process can comprise, consist essentially of, or consist of (1) heating the composition at a temperature sufficient to produce an activated composition; (2) contacting the activated composition with an oxygen-containing fluid whereby a deactivated composition is produced; and (3) contacting the deactivated composition under reducing atmosphere and at a low temperature wherein the composition can comprise, consist essentially of, or consist of platinum, iron, and an inorganic support; or can comprise, consist essentially of, or consist of palladium, platinum, iron, and an inorganic support.

18 Claims, No Drawings

6,093,670

CARBON MONOXIDE OXIDATION CATALYST AND PROCESS THEREFOR

FIELD OF THE INVENTION

This invention relates to a carbon monoxide oxidation catalyst composition and a process for producing the catalyst composition.

BACKGROUND OF THE INVENTION

The use of catalysts for the oxidation of carbon monoxide to carbon dioxide by reaction with oxygen, particularly at low temperature, is of much interest in, for example, breathing masks designed for removing carbon monoxide from inhaled air and carbon dioxide lasers for combining carbon monoxide and oxygen formed by dissociation of carbon dioxide during discharge. However, known carbon monoxide oxidation catalysts are generally air-sensitive. That is, the catalysts partially deactivate on exposure to atmospheric air. Therefore, there is an ever present need to develop a new carbon monoxide catalyst composition and a process for producing the composition.

SUMMARY OF THE INVENTION

An object of this invention is to provide a composition which can be used as a catalyst for carbon monoxide oxidation. Another object of the invention is to provide a process for producing the composition. A further object is to provide a composition which can be effectively reactivated under a mild condition. An advantage of this invention is that the composition produced is less sensitive to exposure to air or oxygen as compared to other known compositions for oxidation of carbon monoxide. Other objects and advantages will become more apparent as the invention is more fully disclosed hereinbelow.

According to a first embodiment of this invention, a composition which can be used as a carbon monoxide oxidation catalyst is provided. The composition can comprise, consist essentially of, or consist of palladium, platinum, iron, and an inorganic support.

According to a second embodiment of this invention, a process for decreasing the air-sensitivity of a carbon monoxide oxidation catalyst composition is provided. The process can comprise, consist essentially of, or consist of (1) heating the composition at a temperature sufficient to produce an activated composition; (2) contacting the activated composition with an oxygen-containing fluid whereby a deactivated composition is produced; and (3) contacting the deactivated composition under reducing atmosphere and at a low temperature wherein the composition can comprise, consist essentially of, or consist of platinum, iron, and an inorganic support; or can comprise, consist essentially of, or consist of palladium, platinum, iron, and an inorganic support.

DETAILED DESCRIPTION OF THE INVENTION

The term "fluid" refers to liquid, gas, or combinations thereof. The term "low temperature", unless otherwise defined, refers to a temperature in the range of from about 0° C. to about 400° C., preferably 0° C. to about 100° C., more preferably about 5° C. to about 50° C., and most preferably 15° C. to 40° C. The term "activated composition" refers to a composition capable of catalyzing the oxidation of carbon monoxide, in the presence of oxygen. The term "deactivated composition" refers to a composition having a reduced activity, as compared to the activated composition, in catalyzing the oxidation of carbon monoxide.

According to this invention, the inorganic support can be an activated carbon, an inorganic oxide, a spinel, or combinations of two or more thereof. The inorganic oxide can be clay, alumina, titania, magnesium oxide, aluminosilicate, or combinations of two or more thereof. If a spinel is used, the metal of the spinel can be zinc, magnesium, iron, manganese, zirconium, molybdenum, ruthenium, rhodium, cobalt, germanium, calcium, or combinations of two or more thereof. Examples of suitable spinels include, but are not limited to, zinc titanate, zinc aluminate, magnesium aluminate, calcium aluminate, and combinations of two or more thereof.

According to this invention, palladium can be present in the composition in the range of about 0.01 to about 10 weight percent (%), preferably about 0.02 to about 5%, and most preferably 0.05 to 4%. Platinum can be present in the composition in the range of from about 0.01 to about 20%, preferably about 0.1 to 10%, and most preferably 0.5 to 5%. Iron can be present in the composition in the range of from about 0.01 to about 10%, preferably about 0.05 to about 5%, and most preferably 0.1% to 3%. The inorganic support generally makes up the rest of the composition. The molar ratio of palladium to platinum can be in the range of from about 0.001:1 to about 10:1, preferably about 0.01:1 to about 10:1, and most preferably about 0.09:1 to about 1:1.

Generally, the surface area, as determined by the BET/$N_2$ method (ASTM D3037), of the inorganic support can be in the range of from about 1 to about 350 $m^2/g$. The support can have spherical, trilobal, quadrilobal or irregular shape. When spheres are used, their diameter generally is in the range of from about 0.1 to about 20 mm.

It is also within the scope of this invention to produce suitable support materials by coating a honeycomb ceramic material, such as a monolith which is commercially available from Corning Glass Works, Corning, N.Y. (described in U.S. Pat. Nos. 4,388,277 and 4,524,051, disclosures of which are incorporated herein by reference) with the inorganic support. The monolith can be impregnated with organic compounds of Al and/or Mg (such as trialkyl aluminum and/or a Grignard reagent), hydrolyzed, dried and calcined. Or the monolith can be impregnated with a dispersion, preferably colloidal, of oxides/hydroxides of aluminum and/or magnesium, followed by drying and calcining.

The impregnation of the support material with platinum and optionally with palladium can be carried out in any suitable manner. First, compounds of platinum are dissolved in a suitable solvent such as water, alcohol, ketone, or combinations of two or more thereof to produce solutions of suitable concentration, generally containing from about 0.0005 to about 0.20, preferably about 0.001 to about 0.1, g of platinum per milliliter of solution. Examples of suitable compounds of platinum include, but are not limited to, $PtCl_2$, $PtCl_4$, $H_2PtCl_6$, $PtBr_4$, $Pt(NH_3)_4Cl_2$, $Pt(NH_3)_4(NO_3)_2$, platinum acetylacetonate, and combinations of two or more thereof. The inorganic support can then be impregnated by incipient wetness or soaking it in the solution of platinum compounds. Examples of suitable palladium compounds include, but are not limited to, $PdCl_6$, $Pd(NH_3)_4Cl_2$, $Pd(NH_3)_4(NO_3)_2$, and combinations of two or more thereof Alternatively, the platinum- and/or palladium-containing solution can be sprayed onto the inorganic support.

A compound of iron can also be present in the impregnating solution. Examples of suitable iron compounds that can be used include, but are not limited to, $FeCl_2$, $FeCl_3$, $Fe_2(SO_4)_3$, $Fe(NO_3)_2$, $Fe(NO_3)_3$, iron acetylacetonate, compounds in which Fe is in the valence state +3, and combinations of two or more thereof. The presently preferred iron compound is $Fe(NO_3)_3$. Generally, the concentration of iron (expressed as Fe metal) is in the range of from about 0.0005 to about 0.4, preferably about 0.001 to about 0.2, g of iron per milliliter solution. The impregnation of the support material with platinum and iron can be carried out either by sequential impregnation or by simultaneous impregnation of a solution containing a platinum compound, a palladium compound, and an iron compound.

When sequential impregnation is employed, the impregnation with a solution of an iron compound is carried out after the platinum-impregnated support is heated. Platinum compound can also be impregnated after an iron compound is impregnated. The ratio of Fe-containing solution to support material is such as to provide a level of weight percent iron disclosed above in the first embodiment of the invention.

Palladium, when present in the composition, can be incorporated into or impregnated onto the support simultaneously with platinum and iron compounds. Alternately, palladium compound can be impregnated sequentially before or after the platinum- and/or iron-incorporation or impregnation.

Multiple incorporation or impregnation steps are generally preferred. Upon the completion of incorporation or impregnation of platinum, iron, and if present, palladium, the composition is calcined. Calcination is generally carried out in air and at a temperature ranging from about 10° C. to about 1000° C., preferably about 150° C. to about 800° C., and most preferably 200° C. to 500° C. Calcination can also be carried out sequentially by first heating at about 30° C. to about 200° C., preferably at about 80° C. to about 130° C., generally for about 0.5 to about 10 hours, to substantially dry the liquid used in incorporation or impregnation, preferably under such conditions that the level of adhered and accluded water is reduced to less than about 20 weight %. The dried, impregnated support can then be heated again at the temperature described above, generally for about 1 to about 20 hours, under such conditions as to substantially calcine the impregnated support so as to obtain oxides of the impregnated metals.

The calcined composition is then activated under a reducing atmosphere at a temperature in the range of from about 25° C. to about 500° C., preferably about 50° C. to about 450° C., and most preferably 100° C. to 350° C. to produce an activated composition. It is presently preferred that the heating under a reducing atmosphere be carried out in a hydrogen-containing fluid such as pure hydrogen. Other reducing atmosphere can contain carbon monoxide, or gaseous hydrocarbons such as methane. Preferably, a free hydrogen-containing gas, more preferably a hydrogen gas stream, most preferably substantially pure hydrogen is employed. Reducing can be carried out for any suitable period of time that is suitable to activate the calcined composition, preferably from about 0.5 to about 20 hours.

The activated composition is generally deactivated upon being contacted with an oxygen-containing fluid such as air. Frequently, the exposure of the activated composition to air or an oxygen-containing fluid is unavoidable when the activated composition is transferred from containers to containers and loaded into an apparatus such as laser. To reactivate the resulting deactivated composition, the deactivated composition is contacted in a reducing atmosphere at a low temperature. The term "low temperature" is defined hereinabove. The reducing atmosphere and time of contacting can be the same as those disclosed above for producing an activated composition.

The process for oxidizing a carbon monoxide-containing fluid can be carried at any suitable temperature and pressure conditions, for any suitable length of time, at any suitable feed rate of the CO-containing fluid (weight hourly space velocity), and any suitable volume ratio of carbon monoxide to oxygen in the oxygen-containing fluid. The reaction temperature generally is in the range of from about 0° C. to about 400° C., preferably from about 0° C. to about 100° C., more preferably from about 10° C. to about 50° C., and most preferably about 20° C. to 40° C. The pressure during the oxidation process generally is in the range of from about 0.001 to about 150 atmospheres (atm), preferably from about 0.01 to about 5 atm. The volume ratio of CO to $O_2$ can range from about 0.01:1 to about 100:1, preferably about 0.05:1 to about 50:1, and most preferably 1:10 to 10:1. The volume percentage of CO and the volume percentage of $O_2$ in the CO-containing fluid and $O_2$-containing fluid can each be in the range of from about 0.005 to about 50, preferably from about 0.05 to about 3. The feed rate can be in the range of from about 0.5 to about 15,000, preferably from about 1 to about 10,000 militers of feed per militer of catalyst per hour. The calculation of the gas hourly space velocity is based on the volume of the active catalyst excluding the volume occupied by any additional inert material, such as a monolith, which can be present.

The feed stream can be formed in any suitable manner. It can be formed by mixing the CO-containing fluid, the $O_2$-containing fluid and, optionally, other gases such as $CO_2$, $H_2$, He, $N_2$ and the like, such as in a carbon dioxide laser cavity. Alternatively, the feed can be an exhaust gas from a combustion engine, an air that is to be inhaled by humans containing undesirably high levels of toxic carbon monoxide, and the like. The feed can be contacted in any suitable vessel or apparatus, such as in a laser cavity or in a exhaust pipe of a combustion engine, or in a gas mask (used by humans), wherein the feed passes over the catalyst composition of this invention at the conditions described above. The CO oxidation process of this invention can be carried out in any suitable setting and for any purpose, such as, for example, to recombine CO and $O_2$ in $CO_2$ lasers, to oxidize CO contained in exhaust gases or in air, to make isotopically labeled $CO_2$ from CO.

The following examples are presented to further illustrate the invention and are not to be construed as unduly limiting the scope of the invention.

EXAMPLE I

This example illustrates the production of catalyst compositions suitable for use in catalyzing carbon monoxide oxidation.

Fifty grams of about ⅛ inch spheres ALCOA S-100 activated alumina which had been washed with 200 ml of distilled water and then calcined at 800° C. for 16 hours, was placed in a porcelain dish (about 15 cm diameter).

Also, 2.015 g of platinum acetylacetonate and 2.534 g of ferric acetylacetonate were added to a 250 ml beaker. Acetone was added to the beaker to produce a platinum-iron solution having a volume of 160 ml.

An aliquot of the platinum-iron solution (20 ml) was slowly added to the alumina, with stirring, followed by drying at 200° C. for 45 minutes. The procedure was repeated 4 times until 80 ml of the solution was added to produce a Pt/Fe-impregnated alumina. The Pt/Fe-impregnated alumina was then calcined at 400° C. for 2 hours in 200 ml/min air to produce a calcined support.

Additional aliquots (20 ml) of the platinum-iron solution was slowly added to the calcined support followed by drying at 200° C. for 45 minutes. The procedure was repeated 4 times until all solution is added to produce Pt/Fe-impregnated support. Thereafter the Pt/Fe-impregnated support was calcined in a 2.54 cm quartz reactor (70 cm long) as follows: 1 hour at 100° C., 2 hours at 200° C., and then 4 hours at 400° C. with 200 ml/minute air flow to produce 50 g of catalyst AA.

Catalysts AA was further treated by heating at 300° C., in the presence of 200 ml/min hydrogen, for 2 hours. Upon cooling, the catalyst (50.0 g) was poured into a 15 cm bowl. After being quickly wetted with 37 g of concentrated nitric acid, the catalyst was calcined again for 1 hour at 100° C., 2 hours at 200° C., and then 4 hours at 400° C. to produce 50 g of catalyst A. Catalyst A contained 2 weight % Pt and 0.8 weight % Fe.

In a separate run, 0.974 g of tetramine palladium (II) nitrate (5.171 weight % Pd) solution was added to a 10 ml beaker. Following the addition of distilled water, a Pd solution (total 5.0 g) was produced.

A portion (10.001 g) of catalyst A in a 50 ml beaker was incipiently wetted with the palladium nitrate solution, by dropwise addition, with stirring to produce catalyst BB. Catalyst BB was then dried at 90° C. for 2 hours, 200° C. for 2 hours, and then 400° C. for 3 hours in a flowing dry air to produce about 10 g of catalyst B. Catalyst B contained 2 weight % Pt, 0.8 weight % Fe, and 0.5 weight % Pd.

Separate runs were carried out using the procedure for producing catalyst B except that the palladium nitrate concentration is adjusted such that the final palladium concentration in the finished catalyst was 0.1 weight % (catalyst C) or 1.0 weight % (catalyst D).

A portion (2.0 g) of catalyst B was further contacted with hydrogen (about 100 ml/minute) for one hour at 20° C. to produce catalyst E.

EXAMPLE II

The example illustrates the experimental setup for testing the activity of supported catalysts produced in Example I for catalyzing the oxidation of carbon monoxide at low temperatures (to simulate catalytic recombination of CO and $O_2$ in $CO_2$ lasers).

A gaseous feed blend comprising CO, $O_2$, He, $CO_2$, and $N_2$ was passed through a flow meter, a needle valve and a glass reactor tube in an upflow direction. The glass reactor tube hand an inner diameter of about 7 mm and generally contained a bed of 2 g catalyst to be tested. The temperature in the catalyst bed was measured by means of a thermocouple inserted into the top of the catalyst bed. The contents of CO in the gaseous effluent from the reactor was determined by means of an Anarad IR analyzer.

All tests were carried out at ambient conditions. Generally the temperature in the catalyst bed rose to about 30° C. because of the generation of heat during the CO oxidation tests. The feed rate of the gaseous feed stream generally was about 400 ml/minute.

Test results are shown in Table I.

TABLE I[a]

| | Catalyst Activity | | | | | | | | | |
|---|---|---|---|---|---|---|---|---|---|---|
| Time (hour) | 0 | 0.5 | 1 | 2 | 3 | 4 | 5 | 10 | 15 | 20 |
| Catalyst A | 2.29 | ND | ND | ND | ND | ND | 2.13 | 2.02 | 1.94 | 1.88 |
| Catalyst B | 1.08 | 0.01 | 0 | 0 | 0 | 0 | 0 | ND | ND | ND |
| Catalyst E | 2.20 | 1.89 | 1.82 | 1.76 | 1.72 | 1.68 | 1.65 | ND | ND | ND |

[a]The values shown are ml of carbon monoxide converted per minute per g of catalyst; ND = not determined.

Table I shows that catalyst B, which was not fully activated by treatment in a reducing atmosphere, had a low activity toward CO oxidation, as compared to catalyst A which had been treated in a reducing atmosphere. However, catalyst E, which was further treated with hydrogen at 20° C. had much improved activity over catalyst B.

Further tests were also conducted with catalysts A, B, C, and D. The results are shown in Table II.

TABLE II

| Test | Catalyst[a] | Pd:Pt ratio wt | Pd:Pt ratio mol | Catalyst Treatment | Catalyst Activity[b] (ml CO/min/gm) | Improvement over no-Pd catalyst |
|---|---|---|---|---|---|---|
| I | A | 0.00 | 0.00 | calcined; no reduction in $H_2$ | 0.00 | |
| | B | 0.25 | 0.46 | | 0.00 | |
| II | A | 0.00 | 0.00 | initial low temp (20° C.) activation in $H_2$ | 1.82 | control |
| | B | 0.25 | 0.46 | | 1.65 | −9.3% |
| III | A | 0.00 | 0.00 | full high temp (300° C.) activation in $H_2$ | 1.79 | control |
| | B | 0.25 | 0.46 | followed by 16 hrs stagnant air | 1.96 | 9.5% |
| IV | A | 0.00 | 0.00 | full high temp (300° C.) reduction in $H_2$ | 1.79 | control |
| | B | 0.25 | 0.46 | followed by 60 min flowing air | 1.98 | 10.6% |
| V | A | 0.00 | 0.00 | full high temp activation, 10 days stagnant | 1.65 | control |

TABLE II-continued

| Test | Catalyst[a] | Pd:Pt ratio wt | Pd:Pt ratio mol | Catalyst Treatment | Catalyst Activity[b] (ml CO/min/gm) | Improvement over no-Pd catalyst |
|---|---|---|---|---|---|---|
|  | B | 0.25 | 0.46 | air, then low temp reduction in $H_2$ | 2.05 | 24.2% |
| VI | A | 0.00 | 0.00 | full activation | 2.22 | control |
|  | B | 0.25 | 0.46 |  | 2.18 | −1.8% |
| VII | A | 0.00 | 0.00 | calcined; no reduction in $H_2$ | 0.00 | control |
|  | C | 0.05 | 0.09 |  | 0.00 |  |
|  | D | 0.50 | 0.92 |  | 0.00 |  |
| VIII | A | 0.00 | 0.00 | initial low temp (20° C.) activation in $H_2$ | 1.68 | control |
|  | C | 0.05 | 0.09 |  | 1.85 | 10.1% |
|  | D | 0.50 | 0.92 |  | 0.91 | −45.8% |
| IX | A | 0.00 | 0.00 | full high temp (300° C.) activation in $H_2$ | 1.79 | control |
|  | C | 0.05 | 0.09 | followed by 4 hrs flowing air | 1.95 | 8.9% |
|  | D | 0.50 | 0.92 |  | 1.89 | 5.6% |
| X | A | 0.00 | 0.00 | full activation, 7 days stagnant air, then | 1.74 | control |
|  | C | 0.05 | 0.09 | low temperature reducing hydrogen | 1.99 | 14.4% |
|  | D | 0.50 | 0.92 |  | 2.14 | 23.0% |

[a]See Example I for catalysts.
[b]Measured as CO conversion, after 5 hours on line under normal test conditions (2.0 gm catalyst, 400 ml/min of 1.20% CO, 0.6% $O_2$ in He, $N_2$, $CO_2$ at room temperature).

Test II shows that on "initial activation" (that is, the first time the fully oxidized catalyst has ever been reduced), in this case at low temperature, the no-Pd control catalyst (A) was more active (1.82) than the Pd-containing test catalyst B (1.65). It appears that, the addition of Pd was not an advantage.

Similarly, Test VI shows that after full activation (high temperature reduction which erased the catalyst memory of any previous oxidations/reductions/air exposures, etc. and put the catalyst in its most active state), the Pd-containing catalyst had no apparent advantage (2.22 vs. 2.18).

In Test VIII, the results were mixed. Test VIII, like Test II, was the first time these catalysts had been reduced. One Pd-containing catalyst (D) was not better. From Test VIII a conclusion about advantage of Pd was unclear. However, in contrast to Tests II, VI, and VIII, Tests V and X show that in every case tested, when the catalysts had been subjected to the full cycle of:

a) full activation (reduction in $H_2$ as high temperature),
b) exposure to ambient air (a variety of conditions were tested), and
c) finally, re-activation in low temperature $H_2$, the Pd-containing catalysts (Test VB=2.05, Text XC=1.99, Test XD=2.14) were always more active than the no-Pd control catalysts Test XA=1.74, Test VA=1.65).

Tests III, IV, and IX further show that the Pd-containing catalysts (in every case) retained more activity on air exposure. That is, under three different air exposure conditions, with three different levels of Pd, the Pd-containing catalysts had a higher activity after air exposure (IIIB, IVB, IXC, and IXD) than did the no-Pd catalysts (IIIA and IXA). In other words, those previously activated, Pd-containing catalyst were more tolerant or resistant to air exposure.

The results shown in the above examples clearly demonstrate that the present invention is well adapted to carry out the objects and attain the ends and advantages mentioned was well as those inherent therein. While modifications may be made by those skilled in the art, such modifications are encompassed within the spirit of the present invention as defined by the disclosure and the claims.

That which is claimed is:

1. A process comprising (1) contacting a reducing atmosphere with a composition comprising palladium, platinum, iron and an inorganic support at a temperature sufficient to produce an activated composition; (2) contacting said activated composition with an oxygen-containing fluid to produce a deactivated composition and (3) contacting said deactivated composition with a reducing atmosphere at a low temperature in the range of about 0° C. to about 100° C. to produce a reactivated composition.

2. A process according to claim 1 wherein said temperature in step (3) is in the range of from 15° C. to 40° C.

3. A process according to claim 1 wherein the molar ratio of palladium to platinum is in the range of from about 0.001:1 to about 10:1.

4. A process according to claim 1 wherein the molar ratio of palladium to platinum is in the range of from about 0.09:1 to about 1:1.

5. A process according to claim 2 wherein the molar ratio of palladium to platinum is in the range of from about 0.09:1 to about 1:1.

6. A process according to claim 1 wherein step (3) of said process is carried out in a hydrogen-containing fluid.

7. A process according to claim 6 wherein said hydrogen-containing fluid is hydrogen.

8. A process according to claim 2 wherein step (3) of said process is carried out in a hydrogen-containing fluid.

9. A process according to claim 8 wherein said hydrogen-containing fluid is hydrogen.

10. A process according to claim 1 wherein said inorganic support is selected from the group consisting of carbon, inorganic oxide, spinel, and combinations of two or more thereof.

11. A process according to claim 1 wherein said inorganic support is selected from the group consisting of clay, alumina, silica, titania, magnesium aluminate, magnesia, aluminosilicate, and combinations of two or more thereof.

12. A process according to claim 7 wherein said inorganic support is selected from the group consisting of alumina, magnesium aluminate, titania, and combinations of two or more thereof.

13. A process according to claim 9 wherein said inorganic support is selected from the group consisting of alumina, magnesium aluminate, titania, and combinations of two or more thereof.

14. A process comprising (1) contacting a reducing atmosphere with a composition comprising palladium, platinum, iron and an inorganic support at a temperature sufficient to produce an activated composition; (2) contacting said activated composition with an oxygen-containing fluid to produce a deactivated composition and (3) contacting said deactivated composition with a reducing atmosphere of hydrogen-containing fluid at about 0° C. to about 100° C. to produce a reactivated composition wherein the molar ratio of palladium to platinum is in the range of from about 0.001:1 to about 10:1; and said inorganic support is selected from the group consisting of carbon, inorganic oxide, spinel and combinations of two or more thereof.

15. A process according to claim 14 wherein said contacting in step (3) is carried out at a temperature in the range of from 15° C. to 40° C.; the molar ratio of palladium to platinum is in the range of from about 0.09:1 to about 1:1; said hydrogen-containing fluid is hydrogen; and said inorganic support is selected from the group consisting of clay, alumina, silica, titania, magnesium aluminate, magnesia, aluminosilicate, and combinations of two or more thereof.

16. A process according to claim 15 wherein said inorganic support is selected from the group consisting of alumina, magnesium aluminate, titania, and combinations of two or more thereof.

17. A process comprising (1) contacting a reducing atmosphere with a composition comprising palladium. platinum, iron and an inorganic support at about 100° C. to about 350° C. to produce an activated composition; (2) contacting said activated composition with air to produce a deactivated composition; and (3) contacting said deactivated composition with hydrogen at about 15° C. to about 40° C. to produce a reactivated composition wherein the molar ratio of palladium to platinum is in the range of from about 0.09:1 to about 1:1 and said inorganic support is selected from the group consisting essentially of clay, alumina, silica, titania magnesium aluminate, magnesia, aluminosilicate and combinations thereof.

18. A process according to claim 17 wherein said inorganic support is selected from the group consisting of alumina, magnesium aluminate, titania, and combinations of two or more thereof.

* * * * *